UNITED STATES PATENT OFFICE.

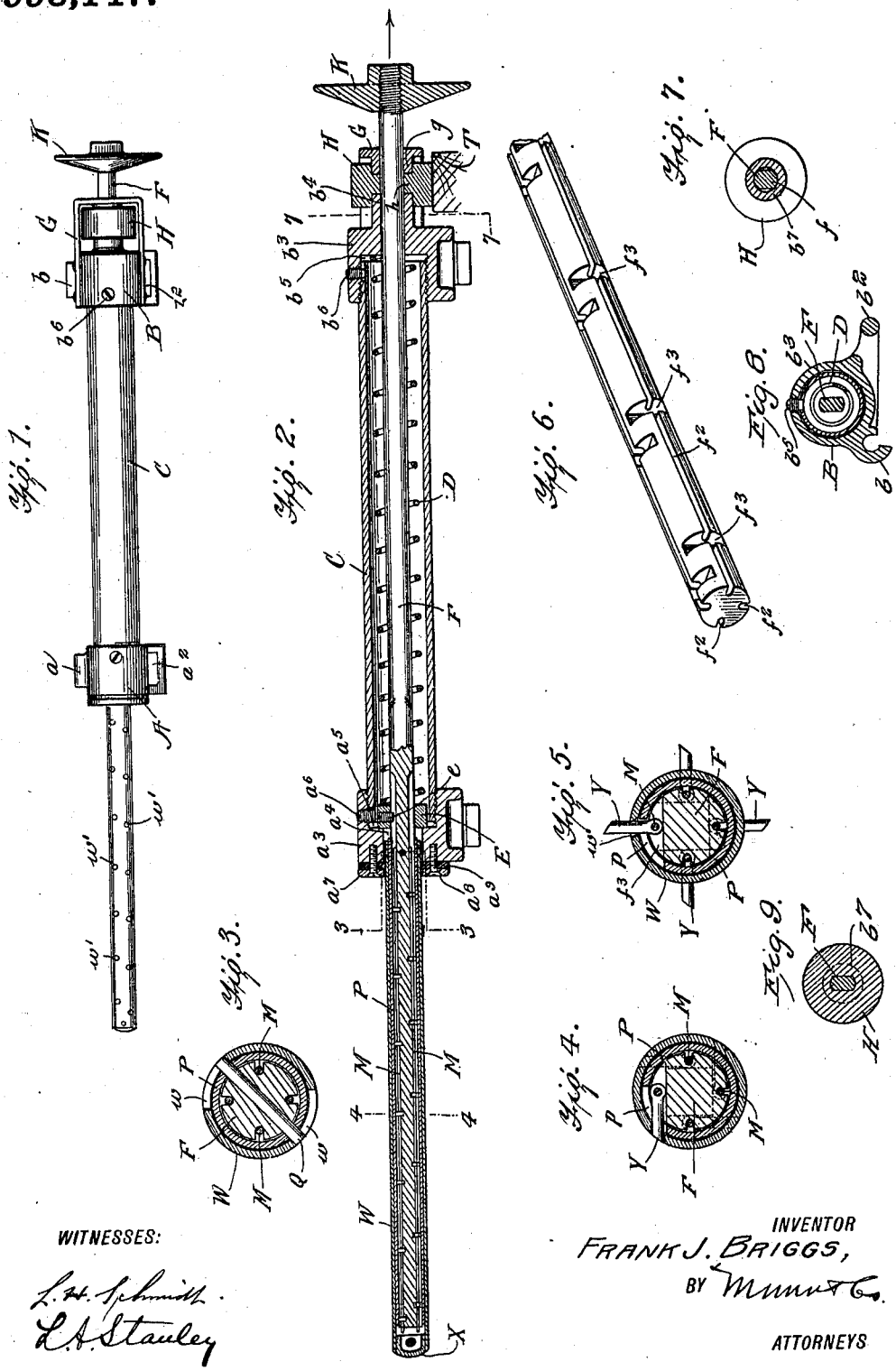

FRANK J. BRIGGS, OF GLENCOE, OKLAHOMA.

PICKER-ARM.

993,147.  Specification of Letters Patent.  Patented May 23, 1911.

Application filed June 2, 1910. Serial No. 564,584.

*To all whom it may concern:*

Be it known that I, FRANK J. BRIGGS, a citizen of the United States, and resident of Glencoe, in the county of Payne and State of Oklahoma, have made certain new and useful Improvements in Picker-Arms, of which the following is a specification.

My invention relates to improvements in picker arms for use with cotton harvesting devices, and it consists in the combinations, constructions and arrangements herein described and claimed.

An object of my invention is to provide an arm having a series of movable pins which may be projected outwardly to engage the cotton, said pins being adapted to be withdrawn into the interior of the arm so that the cotton may be forced off from the arm.

A further object of my invention is to provide a device in which the part of the arm upon which the cotton is gathered may be withdrawn into a sleeve, thereby freeing the cotton from the arm.

A further object of my invention is to provide a pair of links, which may be inserted in sprocket chains, said pair of links bearing the sleeve and its telescopic arm.

A further object of my invention is to provide simple means for causing the projection or retraction of the pins from, or into, the portion of the arm upon which the cotton is gathered.

Other objects and advantages will appear in the following specification and the novel features of this device will be particularly pointed out in the appended claims.

My invention is illustrated in the accompanying drawings forming part of this application in which similar reference characters denote like parts in the several views, and in which, Figure 1 is a plan view, showing one embodiment of my invention, Fig. 2 is an enlarged view, showing the central section through the device, Fig. 3 is an enlarged section along the line 3—3 of Fig. 2, with the link members removed for sake of clearness, Fig. 4 is a section along the line 4—4 of Fig. 2 showing the pins in their retracted positions, Fig. 5 is a section along the line 4—4 of Fig. 2 showing the pins in their extended positions, Fig. 6 is a perspective view of the inner rod, and Fig. 7 is a section along the line 7—7 of Fig. 2, Fig. 8 is a section on the line 8—8 of Fig. 1, and Fig. 9 is a section on the line 9—9 of Fig. 2.

My invention is designed to be used with a cotton picker or harvester such as that disclosed in my prior application, Serial Number 487,608, filed April 3, 1909. In the aforesaid application I disclosed a picker arm, which is adapted to be rotated by means of a roller on the end of the movable part, and means is also provided for causing the retraction of the arm into the sleeve to force the cotton off from the arm.

The present invention has for its object an improvement over that disclosed in said application.

This improvement consists in the provision of pins for more positively engaging the cotton so as to insure the complete picking of the same in the passage of the machine over the cotton plants.

In carrying out my invention, I provide two links A and B. These links are provided with their respective tongues $a$ and $b$ on one side, and the loops $a^2$ and $b^2$ on the opposite side. The link A is provided with a housing, such as that shown in Fig. 2. This housing consists of a body portion $a^3$, having a central circular opening $a^4$ therethrough and a larger threaded recess $a^5$ to receive the threaded end of a sleeve C. The link B comprises a similar body portion $b^3$, having a central opening $b^4$, and a larger threaded recess adapted to receive the opposite threaded end of the sleeve C. In order to keep the sleeve C from rotating in the threaded recesses $a^5$ and $b^5$, I provide the respective set screws $a^6$ and $b^6$. Within the sleeve C is a spring D, which bears at one end on a head E, which is secured by means of the set screw $e$ to a rod F. A portion of this rod is cylindrical. One end of the rod passes through the link member A, and the other end passes through the link member B. Secured to the outside of the link member B is a U-shaped bearing member G, through which the rod F also passes. The link B has a cylindrical portion $b^7$, which is in alinement with a cylindrical portion $g$ of the bearing member G. A roller H is mounted on the bearing portions $b^7$ and $g$. This roller has a reduced portion $h$, which engages the rod F loosely, so as to permit the rod to slide through the roller. The rod, however, is flattened on its opposite sides where it slides through the roller, as shown in Fig. 7, at $f$, so that when the roller H is rotated the rod F is also rotated with it. On the end of the rod F is a cone-shaped contact member K whose purpose will be explained hereinafter.

The construction of the opposite end of the rod F is best shown in Fig. 6. From this figure, it will be seen that the rod is provided with a series of longitudinal grooves $f^2$ spaced ninety degrees apart, and with a series of transverse grooves $f^3$ also spaced ninety degrees apart, and in staggered relation along the rod. Wires M are secured in the longitudinal grooves $f^2$. On the outside of the rod F is a sleeve P, which is secured to the rod by means of a pin Q (see Fig. 3). On the outside of the sleeve P is an outer sleeve or tube W. At the point where the pin Q passes through the rod F and through the sleeve P the tube W is slotted, as shown at $w$ in Fig. 3. The end of the tube W is closed by a cap X.

The link member A is provided with a cap $a^7$, which is secured to the body portion $a^3$ by means of a screw $a^8$, suitable packing $a^9$ being interposed between the cap and the body portion, as shown in Fig. 2.

In Figs. 4 and 5 it will be seen that I have provided a series of pins Y, which are pivotally mounted on the wires M in the slots $f^3$. These pins pass through arc-shaped slots $p$ in the sleeve P and also through inclined openings $w'$ in the outer tube W.

From the foregoing description of the various parts of the device, the operation thereof may be readily understood. In practice a series of arms such as I have described will be carried on a pair of chains by means of links (not shown) which are adapted to hook into the links A and B. The roller H is a friction roller and is adapted to engage a track T, located on the main body of the machine. The rotation of the roller H will cause the revolution of the rod F. From Fig. 3, it will be seen that the rod may rotate independently of the outer tube W, until the pin Q engages the end of the slot $w$. It will do this, provided there is any external friction on the tube W, which is the case when the tube is passing through the cotton plants. The rotation of the rod F relatively to the tube W will cause the projection of the pins from the positions shown in Fig. 4 to that shown in Fig. 5. Now as the rod is further rotated the tube W and the pins Y will be carried around. The pins will tend to pull the cotton from the bolls, and wind it around the tube W. Now, if the rod F is rotated in the opposite direction, the pins Y will be withdrawn into the arm, leaving the cotton clinging to the smooth exterior of the tube W. At this point of the operation a cam member (not shown) engages the disk K and forces the rod in the direction indicated by the arrow in Fig. 2, thus pulling the tube W within the sleeve C and forcing the cotton off from the end of the tube, into the proper receptacle. As soon as the disk K has cleared the cam, the spring D will force the tube W outwardly again into its initial position.

The shape of the track T, which engages the roller and of the cam which engages the disk K, forms no part of the present invention. It is obvious that the arm as described may work with various shaped tracks or cams.

I claim:

1. In a picker arm, a sleeve, bearing links secured to said sleeve at each end thereof, a rod rotatably carried by one of said bearing links and provided at one end with a cam roller, and a perforated tube rotatably mounted on the opposite end of said rod, said rod and tube being arranged to slide within the sleeve, a portion of said tube being supported by the other of said bearing links.

2. In a picker arm, a sleeve, bearing links secured to said sleeve at each end thereof, each of said bearing links being provided with a loop and a hook, a rod rotatably carried by one of said bearing links and provided at one end with a cam roller, a perforated tube rotatably mounted on the opposite end of said rod, said rod and tube being arranged to slide within the sleeve, a portion of said tube being supported by the other of said bearing links, and a roller carried by one of said bearing links, said roller being splined to said rod.

3. In a picker arm, a pair of links, a sleeve secured to said links, a rod disposed within said sleeve, a friction roller carried by one of said links and splined to the rod, a cam member carried by the end of the rod, a series of pins pivotally mounted on the opposite end of the rod, a sleeve carried by the rod and provided with slots for the reception of the pins, and a perforated tube disposed outside of the sleeve, said pins being adapted to extend through the perforations in said outer tube when the roller is turning in one direction and to be withdrawn into said tube when the roller is rotated in the opposite direction.

FRANK J. BRIGGS.

Witnesses:
 TERRY MARLIN,
 WILLIS MARLIN.

---

Copies of this patent may be obtained for five cents each, by addressing the "Commissioner of Patents, Washington, D. C."